US008595355B1

(12) United States Patent
Krish

(10) Patent No.: US 8,595,355 B1
(45) Date of Patent: Nov. 26, 2013

(54) SYSTEM AND METHOD FOR OPTIMIZING AND PROCESSING ELECTRONIC PAGES IN MULTIPLE LANGUAGES

(75) Inventor: Ari V. Krish, Dublin, CA (US)

(73) Assignee: Internet Patents Corporation, Rancho Cordova, CA (US)

( * ) Notice: Subject to any disclaimer, the term of this patent is extended or adjusted under 35 U.S.C. 154(b) by 0 days.

(21) Appl. No.: 11/519,987

(22) Filed: Sep. 12, 2006

Related U.S. Application Data

(63) Continuation of application No. 09/440,442, filed on Nov. 15, 1999, now Pat. No. 7,107,325.

(51) Int. Cl.
*G06F 15/173* (2006.01)
*G06F 15/16* (2006.01)

(52) U.S. Cl.
USPC ........... 709/225; 709/202; 709/217; 709/231; 709/250

(58) Field of Classification Search
USPC ................. 704/2–3; 709/202–203, 217–220, 709/223–226, 245–246, 25, 250, 231–232; 719/328; 715/203–205; 707/E17.115, 707/E17.116
See application file for complete search history.

(56) References Cited

U.S. PATENT DOCUMENTS

| | | | | |
|---|---|---|---|---|
| 5,533,116 A | * | 7/1996 | Vesterinen | 379/243 |
| 5,590,317 A | * | 12/1996 | Iguchi et al. | 707/2 |
| 5,793,381 A | | 8/1998 | Edberg et al. | 345/467 |
| 5,835,712 A | * | 11/1998 | DuFresne | 709/203 |
| 5,873,111 A | | 2/1999 | Edberg | 707/536 |
| 5,889,481 A | * | 3/1999 | Okada | 341/51 |
| 5,890,184 A | * | 3/1999 | Ooishi | 715/203 |
| 5,944,790 A | | 8/1999 | Levy | 709/218 |
| 5,974,443 A | * | 10/1999 | Jeske | 709/217 |
| 5,986,654 A | | 11/1999 | Alexander et al. | 345/744 |
| 6,081,837 A | | 6/2000 | Stedman et al. | 709/219 |
| 6,119,078 A | | 9/2000 | Kobayakawa et al. | 704/3 |
| 6,122,661 A | | 9/2000 | Stedman et al. | 709/217 |
| 6,151,631 A | | 11/2000 | Ansell et al. | 709/229 |
| 6,192,415 B1 | | 2/2001 | Haverstock et al. | 709/245 |
| 6,230,196 B1 | | 5/2001 | Guenthner et al. | 709/223 |
| 6,247,048 B1 | * | 6/2001 | Greer et al. | 709/219 |
| 6,289,358 B1 | | 9/2001 | Mattis et al. | 707/203 |
| 6,295,542 B1 | * | 9/2001 | Corbin | 715/205 |
| 6,314,469 B1 | | 11/2001 | Tan et al. | 709/245 |
| 6,332,131 B1 | | 12/2001 | Grandcolas et al. | 705/35 |
| 6,336,135 B1 | | 1/2002 | Niblett et al. | 709/215 |

(Continued)

OTHER PUBLICATIONS

*The Unicode® Standard*: A Technical Introduction; unicode.org/unicode/standard/principles.html, 7 pages.

*Primary Examiner* — Bharat N Barot
(74) *Attorney, Agent, or Firm* — Campbell Stephenson LLP

(57) ABSTRACT

A web page processing system that processes users requests using predefined, flexible templates and corresponding logic. Main processing handles non-departmental specific functions such as security and data decoding and encoding. Data decoding and encoding includes converting data to a universal character coding representation. The system also includes software for determining the character set used by a user for converting universal character coded data into a particular language code. The system includes a secure private protocol for advantageously securing the system in addition to traditional router based firewall technology. Links to departmental level functions through template files are provided for department specific functions and processing of department related information received by the system. In addition, web page customization is provided by specialized links to external web sites containing logos and other indicia to be included on returned web pages.

11 Claims, 6 Drawing Sheets

(56) References Cited

U.S. PATENT DOCUMENTS

| | | | |
|---|---|---|---|
| 6,385,646 B1 * | 5/2002 | Brown et al. | 709/217 |
| 6,415,335 B1 | 7/2002 | Lowery et al. | 710/5 |
| 6,433,795 B1 | 8/2002 | MacNaughton et al. | 345/738 |
| 6,446,133 B1 | 9/2002 | Tan et al. | 709/245 |
| 6,477,565 B1 | 11/2002 | Daswani et al. | 709/217 |
| 6,480,882 B1 | 11/2002 | McAdam et al. | 709/202 |
| 6,542,933 B1 * | 4/2003 | Durst et al. | 709/229 |
| 6,826,759 B2 | 11/2004 | Calder et al. | 719/328 |
| 6,950,881 B1 * | 9/2005 | Ndili | 709/246 |
| 6,980,970 B2 * | 12/2005 | Krueger et al. | 705/74 |
| 7,107,325 B1 * | 9/2006 | Krish | 709/217 |
| 7,185,101 B2 * | 2/2007 | Rader | 709/230 |
| 7,693,959 B2 * | 4/2010 | Leighton et al. | 709/217 |
| 8,229,848 B2 * | 7/2012 | Krueger et al. | 705/74 |

* cited by examiner

SYSTEM AND METHOD FOR OPTIMIZING AND PROCESSING ELECTRONIC PAGES IN MULTIPLE LANGUAGES

CROSS-REFERENCE TO RELATED APPLICATIONS

This application is a continuation of U.S. patent application Ser. No. 09/440,442, entitled "System And Method For Optimizing And Processing Electronic Pages In Multiple Languages", filed Nov. 15, 1999, now U.S. Pat. No. 7,107,325 and naming Ari V. Krish as the inventor. This application is assigned to InsWeb Corporation, the assignee of the present invention, and is hereby incorporated by reference, in its entirety and for all purposes.

BACKGROUND

1. Field

This field relates to the client/server computing environment, and particularly for optimally processing web pages in a multiple language client/server environment.

2. Description of the Related Art

As more businesses enter the Internet and the World Wide Web (the "web") environments, customers have multiple businesses in similar areas to look for products and services. These customers are from a variety of countries and speak a multitude of different languages. In addition, as competition increases, the need to create more, consistent, and better content to display to users also increases. A company that does not create more, consistent, and better content lags behind its competitors that do provide such content.

Conventional systems require programmers to program pages of content information to be displayed to users. This content is often written in the Hypertext Markup Language (or "HTML"), or other scripting language designed to provide pages of information to end users that access the company's web site over the Internet. Company web sites often contain large quantities of information. However, companies on the Internet want to provide a certain "look and feel" to each page of their web site to help distinguish their web site from web sites of competitors. Certain areas of the pages of information to be shown to users is sometimes dedicated to common graphics or themes. For example, a company may choose to place its logo on the upper left hand corner of each web page shown to users. Additionally, a company may divide each web page shown to users into various "frames" of information. A frame along the left side of the page may be dedicated to icons for hot-linking to other areas within the web site of possible interest to the user. A frame along the right side may be dedicated to advertisements of the company or its business partners, and a frame across the top of the page may be dedicated to other company related information, press announcements, or the like.

Conventional systems require the programmers preparing web pages to program the page areas in a consistent manner as set forth by company policy. In this manner, when combined on the web site, the collective web pages provide the consistent "look and feel" that help market and distinguish the company from competitors and provide a consistent look with which end users can become familiar and comfortable. However, conventional systems have shortcomings that need to be addressed.

One shortcoming of conventional systems is that it takes considerable time to program the collective pages and ensure the desired consistency. If a programmer fails to follow the guidelines set forth by the company, the consistency of the collective web pages is diminished. Internet commerce is increasingly competitive and high paced. The amount of time needed to program consistent web pages may exceed that of competitors. If a company cannot keep pace with its competitors on the Internet, its competitors will soon capture greater market share and greater profits.

Another shortcoming of conventional systems is that a desired change to the look and feel of a company's web site involves changing numerous web pages involving increased time and effort. Adding new logos or changing the content or location of common frame areas involves changes to multiple web pages. Each time a web page is changed the chances of introducing an error or programming bug are increased. These bugs or errors may cause web pages to be unusable or create user dissatisfaction and reflect poorly on the company's reputation when encountered by users.

Another shortcoming of conventional systems is that such systems are generally not compatible for use by all of the major languages of the world. Adding multi-language support in conventional systems often involves creating additional language-specific web servers to process a particular language request. The creation of language-specific web servers winds up compounding the shortcomings described above. An additional shortcoming of multi-language support in conventional systems is that the databases of information collected from users are often separated for at least two reasons. First, the web servers are separated from one another to provide multi-language support. And second, the character sets used by the many languages are often not compatible with one another. For example, double-byte character sets, such as the Japanese JIS and Shift-JIS character sets require two bytes of data per character while the characters of the English language only require one byte. A field that is 10 bytes long in English will therefore only accommodate 5 Japanese characters. Character sets have been established, such as Unicode®, that provides a common character set for most languages of the world. However, these character sets are rather new and are not readily processed by end user computers running various browser programs to access the company's web site. The character sets used by end users is further complicated by the different character sets provided by different computing platforms used by end users. For example, a personal computer running Windows 95/98/NT as an operating system and Netscape Navigator or Microsoft Explorer as a web browser may utilize a different character set in some countries than an Apple MacIntosh or Unix environment.

Accordingly, it is desirable to have a system that can create a web site with a consistent "look and feel" without the shortcomings described above. This consistency should be provided while making the development and delivery of content more rapid than with conventional systems. It is also desirable to have a system that reduces language barriers by using a universal character set, such as Unicode®, to exchange information in multiple languages with end users. This reduction of language barriers should accommodate users from many platforms without forcing such users to use a particular character set.

SUMMARY

It has been discovered that a system using a common software engine to provide the look and feel of the web site with multiple templates and logic rules used to provide the specific content on specific web pages to advantageously address the aforementioned shortcomings of the prior art regarding content and look and feel of the web site. The system includes a registration process linking template information with logic information, so that the logic information provides logic for analyzing and collecting the information in a template. An operator and tag protocol is established for the efficient preparation of template files.

To address the multi-language shortcomings of the prior art, a known character is inserted in the stream of data returned by the end user. The specific character code returned to the system and associated with the known character is analyzed to determine the general character code being used by the user. The information is converted into a universal code language, such as Unicode®, and stored in a database associated with the system. In this manner, data from end users using multiple languages can be stored into a common database. The general character set being used by the end users is saved. Data returned to the end user is converted from the universal code language (or the language based at the company) into the general character set used by the end user so that the information is able to be processed by the end user's computer system and understood by the end user.

The foregoing has outlined features and technical advantages of the described system so that those skilled in the art may better understand the detailed description of the invention that follows. Additional features and advantages of the system are described hereinafter that form a specific implementation relating to the appended claims. Those skilled in the art should appreciate that they can readily use the disclosed conception and specific embodiment as a basis for designing or modifying other structures for carrying out the described features. Those skilled in the art should also realize that such equivalent constructions do not depart from the spirit and scope of the invention in its broadest form.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
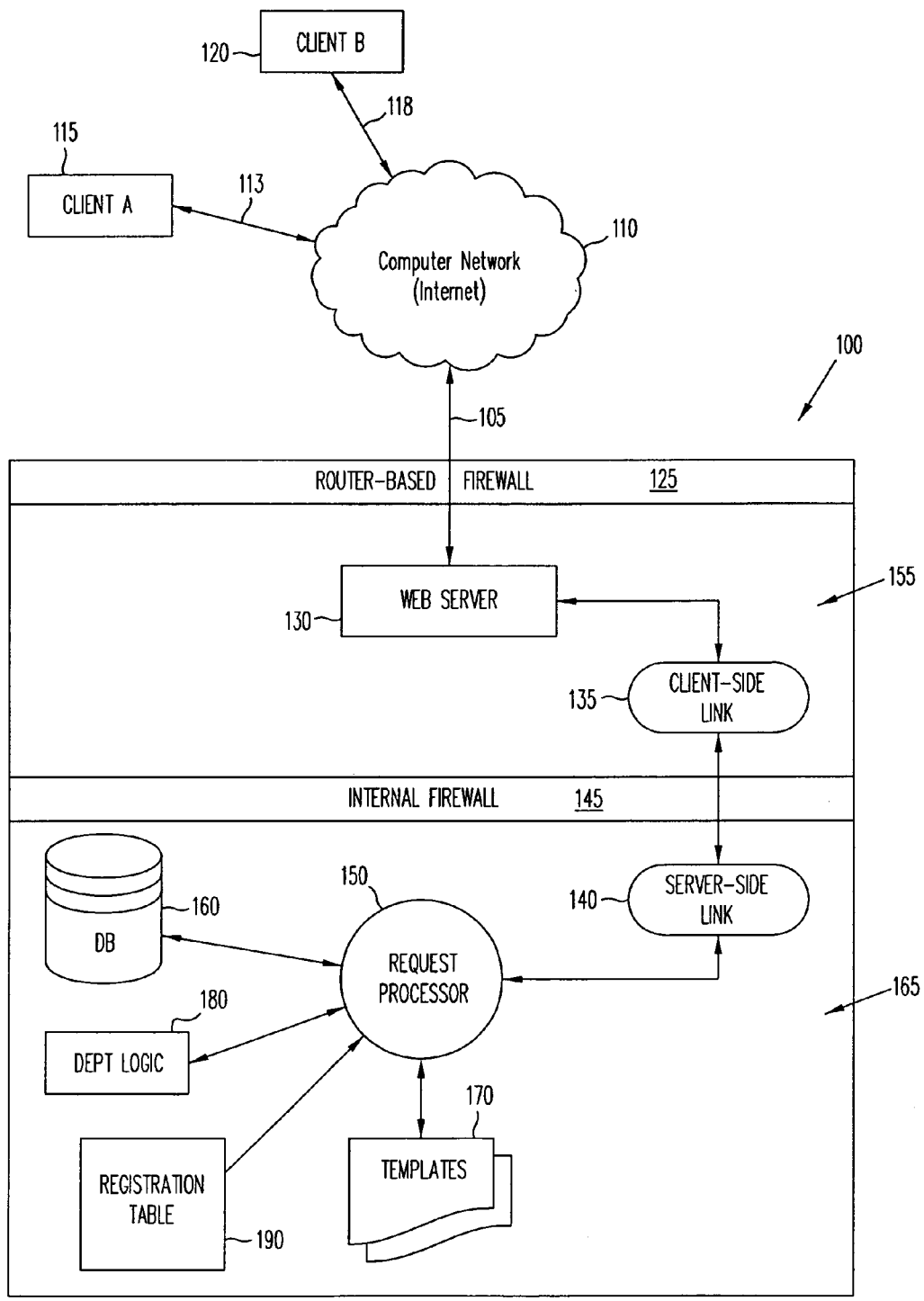
FIG. 1 is a high level system diagram of one implementation of the system.

Referring initially to FIG. 1, illustrated is a high level system diagram of a computer system. Computer network 100 is shown connected to three computers. In the example implementation, computer network 100 is the Internet, however other computer networks connecting two or more users could be used in place of the Internet. The Internet provides for broad ranges of computers to connect to the network. These computers may be in different countries, consist of different platforms (e.g., personal computers running Microsoft 95/98/NT, Unix workstations, and mainframe computers), and using different character sets (e.g., ASCII for personal computers used by English speaking users in the United States, Shift-JIS for computers displaying Japanese characters to a Japanese speaking user in Japan). Server 100 is shown connected to computer network 100 by server connection 105. Two client computers are shown connected to computer network 110 and communicating with server 100. Client A 115 is shown connected to computer network 110 using client connection 113. Client B 120 is shown connected to computer network 110 using client connection 118. The connections (105, 113, and 118) can be of a variety of types (i.e., modem, ADSL, ISDN, cable modem, T1 line, etc.). Generally, systems such as server 100 designed to serve multiple users have greater processing capacities and higher speed connections to computer network 110 than client computers that are based in an individual's residence.

FIG. 1 shows router-based firewall 125 used between web server software 130 and computer network 110. Router-based firewall 125 is used to provide security to server 100 by keeping hackers and other non-authorized individuals from performing malicious attacks on software stored on server 100. While router-based firewall 125 protects server 100 from most or all hacker attacks, a second firewall, internal firewall 145, is shown further protecting certain components within server 100. Server 100 may be comprised of one or more computers. To better isolate the components protected by internal firewall 145, a separate computer could be used to store components in internal firewall protected area 165. A secret protocol is established that is only known by external firewall protected area 155 and internal firewall protected area 165. If a hacker does break into external firewall protected area 155, it is extremely unlikely that the hacker will know the secret protocol needed to communicate with internal firewall protected area 165 so any damage a hacker causes would be limited to external firewall protected area 155. External firewall protected area 155 and internal firewall protected area 165 communicate across internal firewall 145 by using client-side link 135 and server-side link 140. Client-side link 135 is preprogrammed to communicate with server-side link using the secret protocol. All communications between external firewall protected area 155 and internal firewall protected area 165 is through client-side link 135/server-side link 140 using the secret protocol.

Figure 2:
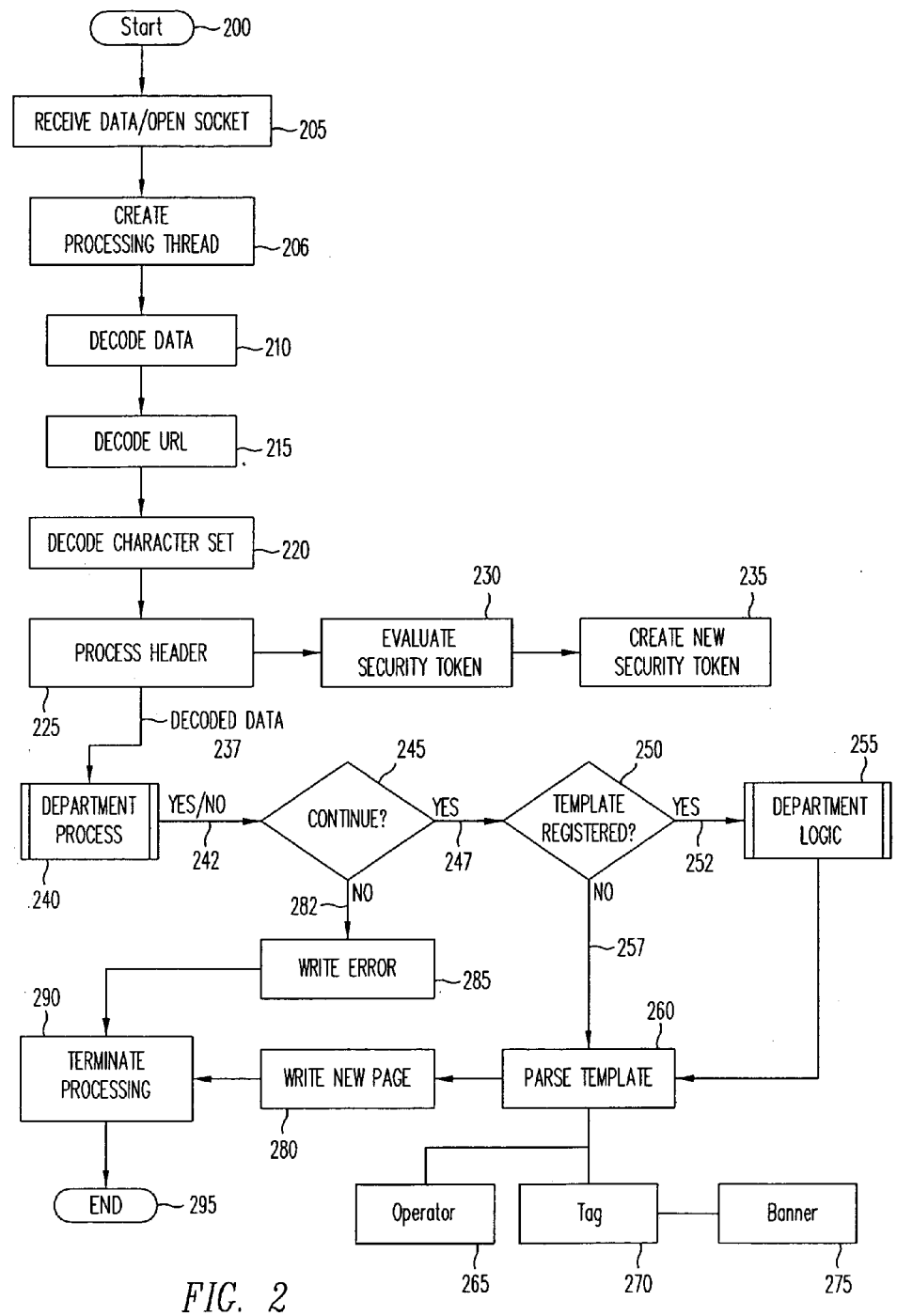
FIG. 2 is a flowchart for processing an incoming data string.
Figure 3:
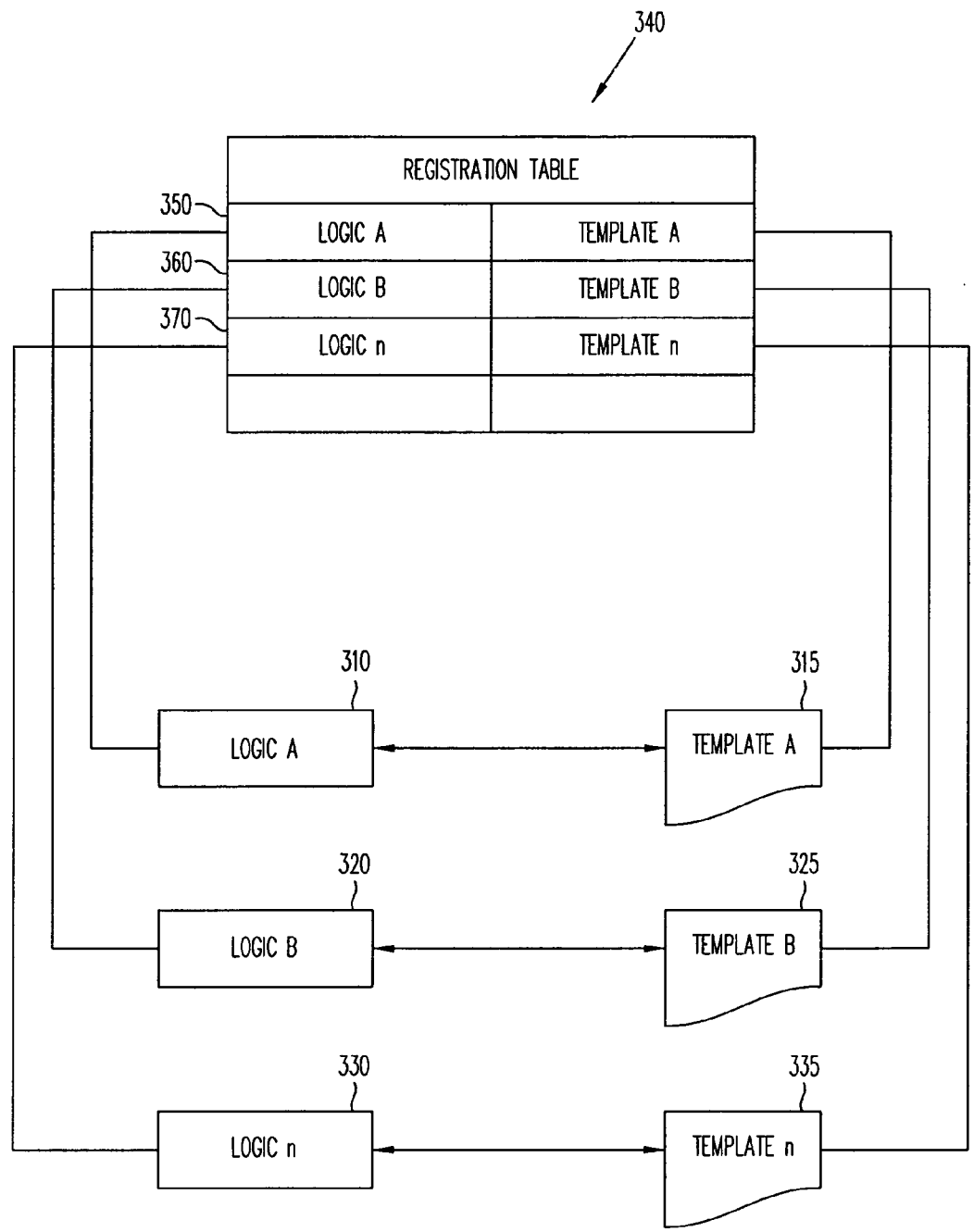
FIG. 3 is a block diagram depicting the relationships between the templates and logic section and a registration table used for keeping track of templates and logic.
Figure 4A:
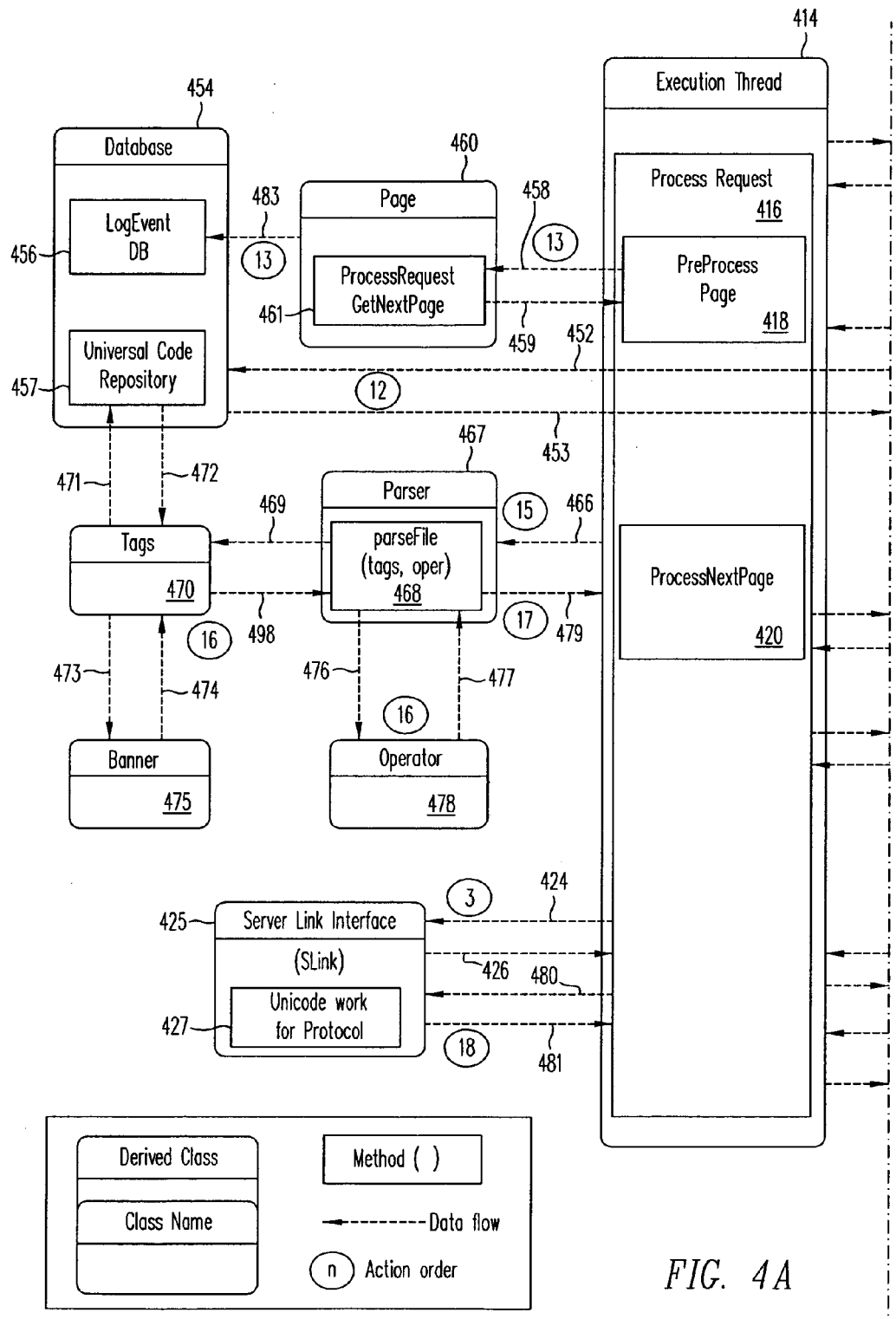
FIG. 4 is a data flow diagram showing an example object oriented implementation of the system with classes, methods, and data flows.
Figures 4, 4B:
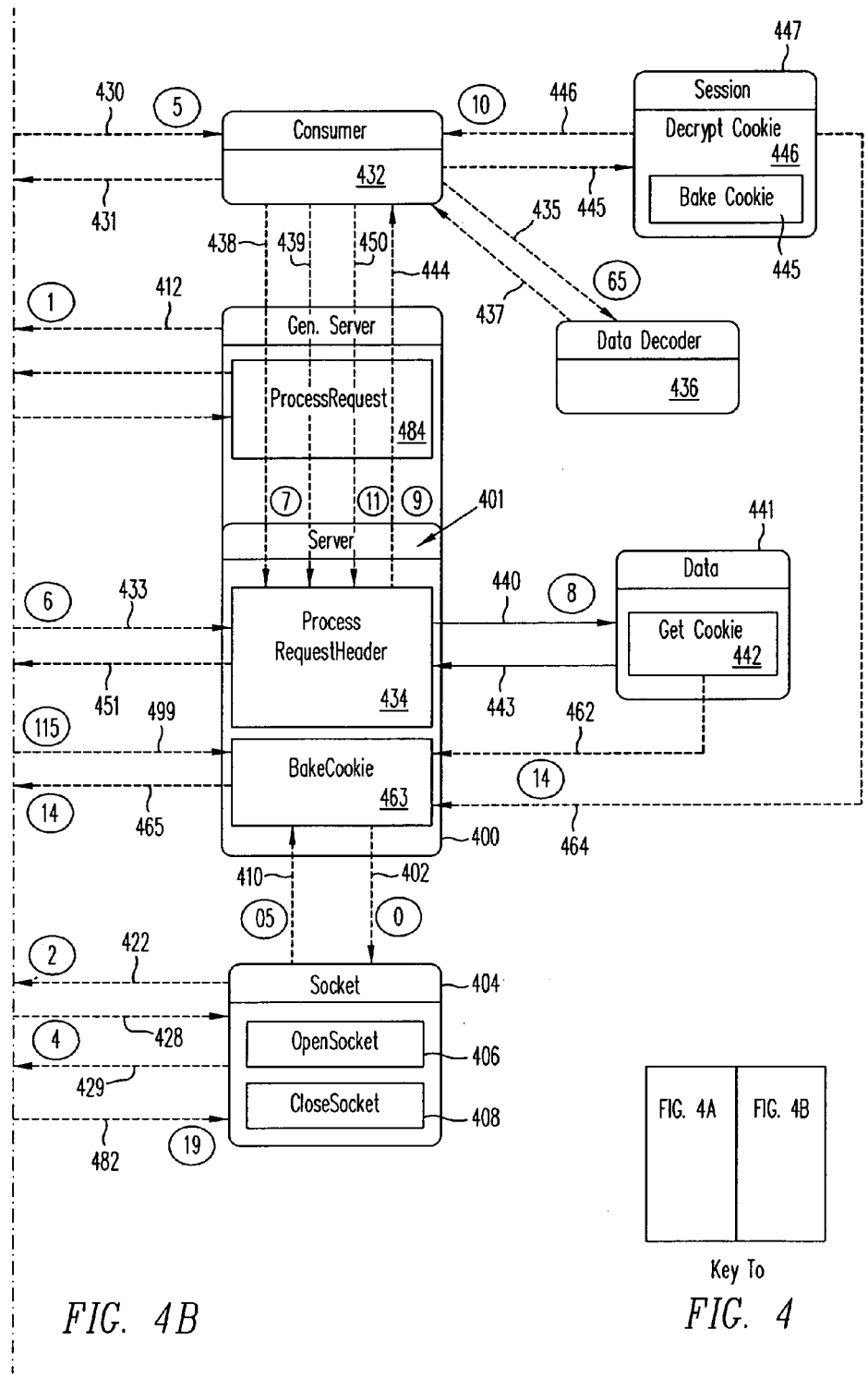
Figure 5:
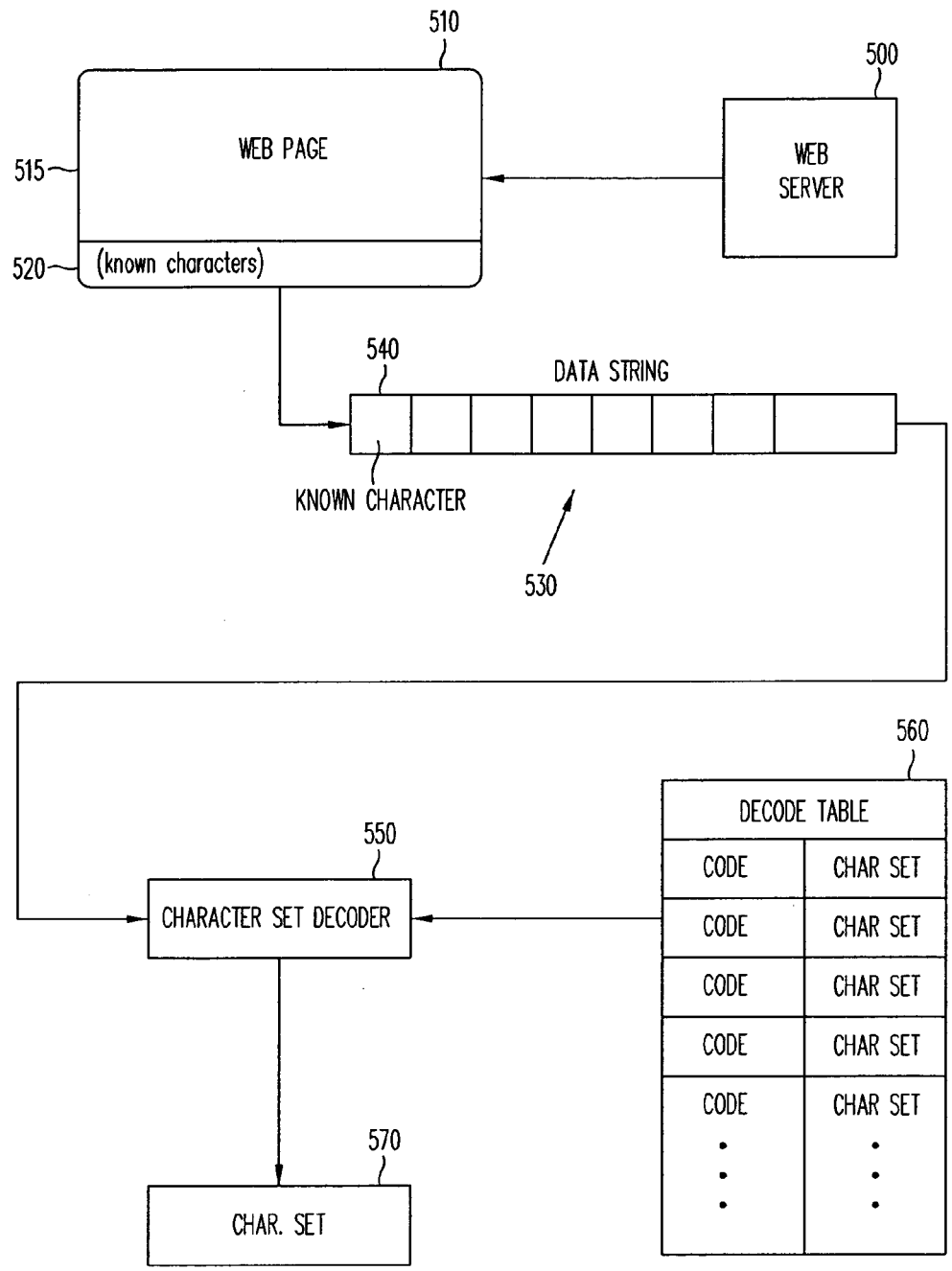
FIG. 5 is a flow diagram showing the decoding of the user's character set.

Once data passes through server-side link 140, it is received at request processor 150. Request processor 150 is a software program that reads the received data, provides the interface with departmental logic 180 and template files 170 using registration table 190. The processing steps of request processor 150 are shown in FIG. 2 and the data flow within request processor 150 is shown in FIG. 4. The relationship between departmental logic 180, template files 170, and registration table 190 is shown in FIG. 3. Data is stored to and read from database 160. To provide multi-language support, the data is converted into a uniform language code, such as Unicode®, before being stored in database 160. Likewise, data pulled from database 160 is converted into the character set used by the user (in this example, Client A 115 or Client B 120) before being sent to the user and displayed on the user's display screen. In order to determine the character set being used by Clint A 115 and Client B 120, data is read from the data string and evaluated for the particular character set being used by the particular client. An example of determining the character set from an end user is shown in FIG. 5.

Turning to FIG. 2, a flowchart is shown illustrating processing steps taken by request processor 150 (see FIG. 1). Following program start 200, Receive Data/Open Socket 205 is performed. Receive Data/Open Socket 205 listens for incoming data from computer network 110 (see FIG. 1). When incoming data is detected, a socket is opened between the client computer and request processor 150 (see FIG. 1). The socket includes establishing a connection between client-side link 135 and server-side link 140. Next, Create Processing Thread 206 is performed to create a processing thread to handle the data being received from the client computer. A thread is created so that the server is able to multitask between multiple client requests, opening a new thread for each incoming request. In one example of Create Processing Thread 206, a limit is set for the number of requests that request processor 150 can handle simultaneously. This limit is based on the processing capacity of the hardware running request processor 150, the speed of server connection 105, and other factors that impact the ability of request processor 150 from processing the user's request. Once Create Processing Thread 206 is completed and a data string has been received from the client computer, Decode Data 210 is performed to decode the data string received from the client computer. Decode Data 210 decodes the data string by determining the name/value pairs included in the data string. Next, Decode URL 215 decodes the URL encoding that is standard in the HTTP protocol. Decode Character Set 220 determines what character set is being used by the user so that the data string can be encoded into a uniform language code, such as Unicode®, before the data string is saved in the system's database. Determining the character set used by the user in Decode Character Set 220 also allows the system to convert data into the character set being used by the user before the returned data is sent to the user. FIG. 5 provides more detail concerning decoding the character set.

The data string that has been received is processed by Process Header 225. To allow for secure communications between the system and the end user, a security token is included to insure that the end user meets certain criteria depending on the security concerns of the web site and the system. For example, a system may want to insure that the user's use of the system has not been idle for more than a particular amount of time. The system may also want to be provided a list of web pages within the system that the user has visited during their use of the system. In one implementation, this information can be packaged in a "cookie" that is saved on the user's computer system and transmitted to the system. To provide further security, this information can be encrypted, also called "baking the cookie," using standard encryption technologies such as RSA, to prevent someone from faking the information packaged in the cookie file. Evaluate Security Token 230 evaluates the security token, e.g., cookie file, by decrypting the information if it was encrypted by the system before being transmitted by the user, and also evaluating the system criteria such as idle time and web pages visited. This information is compared to values and other constraints stored in the system so that if the information returned by the user is not within certain parameters an error is returned to the user or other corrective action is taken depending upon the condition (i.e., a time-out due to an extended idle period may require the user to log in again, if certain web pages have been visited then a certain set of web pages may be made available to the user, etc.). Finally, at Create New Security Token 235, a new security token is created using data coinciding with the user's current data string provided to the system. Some of this information may be combined with information from the previous security token (i.e., web pages visited, etc.) as well as a time/date stamp updating the last time the user accessed the system.

An external process, Department Process 240, is shown receiving Decoded Data 237. After the data is decoded, the system provides flexibility in processing by providing Decoded Data to an external departmental process depending upon the data returned. For example, in an insurance company application, the system starting at Start 200 may process all requests for the system regardless of what product in which the user is interested. If the user is wanting information about automobile insurance, then the system passes Decoded Data 237 to Department Process 240 established for automobile insurance. In this way, the system can handle the majority of processing in an efficient manner and call external processes only when the main system needs information specific to a certain department. In this case, Department Process 240 received Decoded Data 237 and returns a Boolean variable (i.e., "Yes", "No") to the system at Data Flow 242. The system receives Data Flow 242 and uses the information to decide whether to continue at Continue? Decision 245. If Department Process 240 decided to continue the transaction, a "Yes" value was passed to the system causing Continue Branch 247 to operate. If the transaction is continuing, the next decision needed is Template Registered Decision 250. As will be explained more fully in FIG. 3 and in Appendix I, template files provide for greater flexibility in providing content for web paged displayed to users. Templates are "registered" with associated logic by web page developers. The logic determines the actions to take if certain data is returned by the user, while the template determines the content to provide to the user. If the template included in the data string returned by the user has been registered, Yes Branch 252 is followed causing external process Department Logic 255 to be invoked. Department Logic 255 provides flexibility in analyzing the user's response and the system's reaction to the user's response. For example, in an insurance application, the user may be inquiring about automobile insurance. In response to questions regarding the user's driving record (i.e., number of traffic violations, etc.) Department Logic 255 associated with the automobile department may determine that the user is a high risk driver and cause a responsive web page to be returned to the user with the classification of high risk and may require further information (i.e., whether the user was ticketed for his or her traffic violations, whether the user was convicted of any crimes or misdemeanors (i.e., driving under the influence, etc.) before providing the user with quotes. On the other hand, if the user had a clean driving record, Department Logic 255 may proceed directly to providing the user with quotes for insurance premiums. Information is returned from Department Logic 255 to Parse Template 260. Parse Template 260 processes the template file either returned by Department Logic 255 or defaulted by the system if No Branch 257 was encountered if Template Registered Decision 250 determined that the template was not registered with the system.

Parse Template 260 prepares a web page by processing three types of information. The an example of a template file is provided in Appendix 1. The corresponding output, showing the Unicode characters embedded in the source code shown in Appendix I, is provided in Appendix II. In the example implementation shown in Appendix Hypertext Markup Language (HTML) and Extended Hypertext Markup Language (XML) code is distinguished from template code by the use of operators "{" and "}". Data found within the { } operators is processed by the system as a template operator. Parse Template 260 includes subtasks of Operator 265, Tag 270, and Banner 275. Operator 265 operates to locate the { } operators within the template file. Tag 270 operates to process the tags found within the operators. For example, in Appendix I, the tag "{itag Package AutoToolHeader}" would operate to provide a header unique to the automobile department (note that this tag line is commented out by the {Comment} and {EndComment} tags above and below the {itag . . . } line). After the {EndComment} tag, two more tags are shown. First, "{itag Package Header}" operates to insert a standard header on the web page and the next line, "{itag Package NavigationBar}" operates to insert a navigation bar on the web page. Further down, an example of departmental processing is shown in the line "{if ageRange:error}" inserts the four HTML lines that follow until the "{endif}" if the ageRange condition is in error. For example, if the user wanting to receive a quote for automobile insurance responded that they were only ten years old, Department Logic 255 would return an age range error and the system would in turn insert the corresponding HTML or XML lines indicating in the returned web page that an error was encountered with the user's entered age. The final subtask, Banner 275, operates to include an optional logo and other "look and feel" information from a corresponding web site. The operator/tag using processed by Banner 275 is in the form of "{Banner <URL>}" where "<URL>" is the Uniform Resource Locator (URL) for the web site from which to receive the URL information. An example would be "{Banner www.yahoo.com}" so that the banner information would be taken from the Yahoo! web site (i.e., the Yahoo logo, etc.). In this way, the system provides flexibility in working with business partners to provide content for portals and other web sites to customize web pages by include logos and other customizing indicia on the resulting pages. For example, a person on the Yahoo! portal web site that selects that he/she wants to shop for insurance would access a third-party system with insurance information but the returned web pages would continue to include Yahoo! logos and indicia and seem to the user to be an extension of the Yahoo! site rather than a completely different web site.

After Parse Template 260 (and its subtasks) has completed, Write New Page 280 writes the new web page to the user using the information gathered and tags processed by Parse Template 260. Once the new page has been written to the socket and returned to the user for display and further processing by the user, processing is terminated by Terminate Processing 290 which closes the socket opened by Receive Data/Open Socket 205 and terminates the processing thread created by Create Processing Thread 206 and processing is ended at End 295. It should be remembered that the flowchart shown in FIG. 2 is for processing a transaction received from a user. The main system continually listens for incoming transactions and for each transaction encountered, a separate thread is created and socket opened in order to process the transaction. Therefore, an occurrence of the processing depicted in FIG. 2 is occurring simultaneously in the system for each received transaction.

Turning now to FIG. 3, a block diagram is shown of the relationships between the template files, associated logic, and the registration table. In the example shown, Logic A 310 is associated with Template A 315, and Logic B 320 is associated with Template B 325. An unlimited amount (constrained only by system resources) of logic and templates can be associated as depicted by Logic n 330 being associated with Template n 335. While 1-to-1 relationships are shown in FIG. 3, 1-to-many, many-to-1, and many-to-many relationships are also possible. For example, multiple templates could be associated with the same logic. A given template file, such as Template A 315, may associate with multiple pieces of logic as set forth by the operators and tags. Examples of the operators and tags can be found in Appendix 1 and FIG. 2 as described above.

Turning to FIG. 4, a data flow diagram is shown depicting data flowing between the classes and method of the system and also showing the approximate order of the data flows through the system in an object-oriented system. A General Server Class 400 includes a Server Class 401 that passes Port Number Flow 402 to Socket Class 404 in order to open a socket for a new transaction. Socket Class 404 includes Open-Socket Method 406 for opening a new socket. Socket 410 is returned to General Server Class 400 which passes the Socket and Server Data 412 to Execution Thread Class 414. Execution Thread Class 414 includes ProcessRequest Method 416, PreProcess Page Method 418, and ProcessNextPage Method 420.

Also passed to Execution Thread Class 414 is the HeadByte Flow 422 containing data from the data string sent from the user. The data in HeadByte Flow 422 is passed in HeadByte Flow 424 from Execution Thread Class 414 to Server Link Interface Class 425. Server Link Interface Class 425 sets up the protocol for communicating between the externally protected firewall area 155 and the internally protected firewall area 165 (see FIG. 1). Server Link Interface Class 425 also includes Unicode Protocol Method 427 for converting and working with data to support a universal code language such as Unicode®. Server Link Interface Class 425 returns Length Flow 426 with length information about the data string received by the system. This length is passed to Socket Class 404 which in turn returns the request included in the data string in Request Flow 429.

The request information is passed in Request Flow 430 to Consumer Class 432 which operates to determine information about the user. Consumer Class 432 returns consumer information in Consumer Flow 431. Information is passed in Data Flow 433 to Process RequestHeader 434 found within Server Class 401. Consumer Class 432 also passes HTTP information found in the data string to Data Decoder Class 436. Data Decoder Class 436 decodes the information contained in the data string as name/value pairs and returns the data in DataList Flow 437. Consumer information is passed in Consumer Flow 438 from Consumer Class 432 to Process RequestHeader Method 434. Likewise, the data returned in DataList Flow 437 is passed from Consumer Class 432 to Process RequestHeader 434 in DataList Flow 439. Process RequestHeader 434 passes the data list information to the Data Class 441 in DataList Flow 440. Data Class 441 includes methods used for processing cookies, including Get Cookie Method 442. The cookie and related information are passed from Data Class 441 back to Process RequestHeader 434 in Cookie/ID Flow 443. The information in Cookie/ID Flow 443 is passed by Process RequestHeader Method 434 back to Consumer Class 432 in Cookie/ID Flow 444. The session, id, executable, and other information are passed in Get Session Flow 445 to Session Class 447. Session Class 447 includes methods for processing the session information placed in cookie files. Decrypt Cookie Method 448 decrypts the cookie information and returns the session id, program id, SessionValid? flag, LoggedOut? flag, TimedOut? flag, and isNew? flag. This information is returned in Session Data Flow 446 back to Consumer Class 432. The consumer information about the user is passed from Consumer Class 432 back to Process RequestHeader Method 434 in Consumer Flow 450 and then onto Process Request Method 416 within Execution Thread Class 414 in Consumer Flow 451.

ProcessRequest Method 484 passes the consumer information data in Consumer Flow 452 to Database Class 454. Database Class 454 includes methods for handling the database including Log Event Database Method 456 and Universal Code Repository Method 457. Universal Code Repository Method 457 stores and retrieves data in and from a Unicode® compatible database. A determination is made as to whether the page is valid and this flag is passed back to Process Request 484 over isValidPage Flow 453. If the page is not valid, error processing is invoked, and if the page is valid, processing continues.

PreProcess Page Method 418 within Execution Thread Class 414 sends consumer and server information to Process Request/Get Next Page Method 461 within Page Class 460. Event information is forwarded to LogEvent DB Method 456 of DataBase Class 454 and stored in the event database. Get Next Page Method 461 passes data regarding the next web pages to pass to the consumer back to PreProcess Page Method 418 in Next Pages Flow 459.

Next, new cookie information is prepared with data regarding the user being passed by Process Request Method 416 to Bake Cookie Method 463 with Get Baked Cookie Flow 499. Bake Cookie Method 463 also receives cookie information from Get Cookie Method 442 in Data Class 441 over Cookie Flow 462 as well as encrypted cookie information from Bake Cooke Method 449 in Session Class 447 returned over Baked Cookie Flow 464. Cookie information is included in the consumer information that is returned to Process Request Method 416 in Consumer Flow 465.

Subsequently, the consumer information (including the updated cookie information) is passed from Execution Thread Class 414 to Parser Class 467 over Consumer & Server Flow 466. Parser Class 467 includes Parse File Method 468 used to build the new web page to return to the end user using the tag information found in the template file. To build the responsive page, Parser Class 467 passes consumer and server information and data from the template file over Consumer & Server Flow 476 to Operator Class 478 to identify the operators within the template file. The responsive web page is updated by Operator Class 478 and Updated Page Flow 477 is returned to Parse File Method 468 for further processing. Tags found within operators found by Operator Class 478 are processed by Tags Class 470. Consumer & Server Flow 469 includes data about the consumer, server, and responsive template file. Tags Class 470 passes server information for the particular departmental server (i.e., automobile insurance server, etc.) to the Universal Code Repository Method 457 within Database Class 454. The departmental server processes the information and returns the tag values within Tag Values Flow 472. If special "banner" tags are encountered, the consumer information and the URL associated with the banner tag are passed to Banner Class 475 over Consumer/URL Flow 473 for fetching information from the URL to customize the responsive web page with logos or other indicia found at the corresponding URL. The HTML or XML associated with the logos and other indicia found at the URL are returned to Tags Class 470 as replacement HTML or XML data for updating the responsive web page. The web page, updated with tag information and banner information, is returned to Parse File Method 468 in Updated Page Flow 498. Once all processing for the template file is completed, Parser Class 467 returns Response Page Flow 479 containing responsive web page information to Execution Thread Class 414 to be sent to the user.

In order to send the information to the user, the responsive web page information is passed back across the internal firewall. Response Page Flow 480 includes responsive web page information and is passed from Process Request Method 416 of Execution Thread Class 414 to Server Link Interface Class 425 enables the data to be passed across internal firewall 145 (see FIG. 1). Server Link Interface 425 processes the information and passes Response Header Flow 481 in the protocol established for communicating across internal firewall 145. Responsive Page Flow 482 is then passed to the socket to be transmitted to the user using Socket Class 404. Socket Class 404 executes its Close Socket Method which operates to close the socket and terminate the processing of the thread of execution after the responsive data is sent to the user.

Finally, turning to FIG. 5, a flow diagram shows the determination of the user's character set in use by the user's computer system. When the user accesses web server 500, a known character is included in the information returned to users computer 510. Web page display 515 displays the web page while known character 520 is stored in either a visible or hidden area of web page display 515. When the user fills in web page display 515 a data string 530 is returned to the system. When the data is placed into data string 530, it is stored as character codes (i.e., hexadecimal values, not the printable characters). Included in data string is the character code for the known character at predetermined data area 540. Character set decoder 550 receives data string 530 and determines the character set by analyzing predetermined data area 540. A decode table 560 is used to correlate the code found in predetermined data area 540 with known character sets. When a matching code is found in decode table 560, the character set is returned and stored. Elements of data string 560 are converted to a universal code language, i.e., Unicode®, and stored in a Unicode® compatible database. Likewise, when Unicode® data is read from the Unicode® compatible database, it is converted to the user's character set before being returned to the user and displayed on the user's display.

The description of the invention set forth herein is illustrative and not intended to limit the scope of the invention as set forth in the following claims. Variations and modifications of the embodiments disclosed herein may be made based on the descriptions set forth herein, without departing from the scope and spirit of the invention as set forth in the following claims.

Appendix I

Template Source Code

```
{Comment} Y2K Compliance : 02/01/1999   StandardFollowed akrish
                        {EndComment}
{Comment}
<!--
{itag Package AutoToolHeader}
-->
{EndComment}
{itag Package Header}
{itag Package NavigationBar}

<FORM METHOD=POST ACTION=/cgi-bin/{exe}>
<INPUT TYPE="HIDDEN" NAME="action" VALUE="submit">
<INPUT TYPE="HIDDEN" NAME="page"
VALUE="/gic/auto/save/default.htj">
<INPUT TYPE="HIDDEN" NAME="cookie" VALUE="{cookie}">
<INPUT TYPE="HIDDEN" NAME="id" VALUE="{id}">

<INPUT TYPE="HIDDEN" NAME="charset" VALUE="☐">
<!--
<INPUT TYPE="HIDDEN" NAME="language" VALUE="{language}">
-->

<FONT FACE="MS Gothic">
<TABLE  WIDTH="100%"
     BORDER=0
     CELLPADDING=1
     CELLSPACING=3 >

<TR>
<!--
<TD  BGCOLOR="#EEEEEE"   WIDTH="100%">
-->
<TD  WIDTH="100%">
{itag Package TitleParamOpen}
<H3><FONT COLOR="#6644AA">
☐☐☐☐☐☐☐☐
</FONT></H3>
{itag Package TitleParamClose}

☐☐☐☐☐☐☐☐☐☐☐☐☐☐☐☐☐☐☐☐☐☐☐☐☐☐☐☐☐☐☐☐☐☐☐☐
☐☐☐☐☐☐☐☐☐☐☐☐☐☐☐☐☐☐☐☐☐☐☐☐☐☐☐☐☐☐☐☐☐☐☐☐☐☐☐
<P>
☐☐☐☐☐☐☐☐☐☐☐
<P>

<TABLE  WIDTH="100%"
     BORDER=0
     CELLPADDING=3
     CELLSPACING=5>

{if page:error}
<TR>
<TD    WIDTH=20>
     <BR>
     <IMG BORDER=0 WIDTH=19 HEIGHT=17 SRC="/images/alert.gif">
</TD>
```

```
<TD   WIDTH="100%" BGCOLOR="#EEEEEE" COLSPAN=2>
      <FONT   FACE="MS Gothic" COLOR="#990000">
      <B>□□□□□□□□□□□□□□□□</B></FONT><BR>
      □□□□□□□□□□□□□□□□□□□□□□□□□□□□□□□□□
      <BR CLEAR=ALL>
</TD>
</TR>
{endif}

<TR>
<TD   WIDTH=20>
      {if ageRange:error}
            <IMG BORDER=0
            WIDTH=19
            HEIGHT=17
            SRC="/images/alert.gif">
      {endif}
</TD>

<TD {itag Package TDParam2} WIDTH="100%">
{itag Package CellParam1Open}
□□□□□□□□□□□□□□□□□□□□□□
□□□□□□□□□□□□□□□□□□□□□□□□□□□
{itag Package CellParam1Close}
</TD>

<!-- <TD NOWRAP WIDTH="100%">{itag Package CellParam1Open}
-->
<TD NOWRAP>{itag Package CellParam1Open}
<NOBR>
<INPUT TYPE="radio" NAME="ageRange" VALUE="yes" {if {ageRange}
-eq yes}CHECKED{endif}>□□<br>
<INPUT TYPE="radio" NAME="ageRange" VALUE="no" {if {ageRange}
-eq no}CHECKED{endif}>□□□
</NOBR>{itag Package CellParam1Close}
</TD>
</TR>

<TR>
<TD   WIDTH=20>
</TD>

<TD {itag Package TDParam2}>
<!--
<table border=0 width="100%" cellpadding=0 cellspacing=0>
-->
<table border=0 width=320 cellpadding=0 cellspacing=0>

<tr align=center valign=top>
<td BGCOLOR="#8866AA"><b>
<FONT COLOR="#FFFFFF" SIZE=-1 FACE="MS Gothic">
□□□□□□□□□<br>□□□</b><br>
</FONT>
</td>
<td BGCOLOR="#8866AA" nowrap></TD>
<td BGCOLOR="#8866AA"><b>
<FONT COLOR="#FFFFFF" SIZE=-1 FACE="MS Gothic">
```

```
□□□□□□□□<br>□□□□□□□</b>
</FONT>
</td>
</tr>

<tr align=center  valign=top>
<td BGCOLOR="#FFFFFF" nowrap>
<FONT SIZE=-1>
□□□□□
</FONT>
</td>
<TD BGCOLOR="#FFFFFF" nowrap>
      <IMG SRC="/images/gic/cptool/arrow.gif" WIDTH=7 HEIGHT=11 ALT="">
</TD>
<td BGCOLOR="#FFFFFF" nowrap>
<FONT SIZE=-1>
□□□□□□
</FONT>
</td>
</tr>

<tr align=center valign=top>
<td BGCOLOR="#EEEEEE" nowrap>
<FONT SIZE=-1>
□□□□□□□□
</FONT>
</td>
<TD BGCOLOR="#EEEEEE" nowrap>
      <IMG SRC="/images/gic/cptool/arrow.gif" WIDTH=7 HEIGHT=11 ALT="">
</TD>
<td BGCOLOR="#EEEEEE" nowrap>
<FONT SIZE=-1>
□□□□□□□
</FONT>
</td>
</tr>

<tr align=center valign=top>
<td BGCOLOR="#FFFFFF" nowrap>
<FONT SIZE=-1>
□□□□□□□□
</FONT>
</td>
<TD BGCOLOR="#FFFFFF" nowrap>
      <IMG SRC="/images/gic/cptool/arrow.gif" WIDTH=7 HEIGHT=11 ALT="">
</TD>
<td BGCOLOR="#FFFFFF" nowrap>
<FONT SIZE=-1>
□□□□□□□
</FONT>
</td>
</tr>

<tr align=center valign=top>
```

```
<td BGCOLOR="#EEEEEE" nowrap>
<FONT SIZE=-1>
□□□□□□□
</FONT>
</td>
<TD BGCOLOR="#EEEEEE" nowrap>
     <IMG SRC="/images/gic/cptool/arrow.gif" WIDTH=7 HEIGHT=11
ALT="">
</TD>
<td BGCOLOR="#EEEEEE" nowrap>
<FONT SIZE=-1>
□□□□□□
</FONT>
</td>
</tr>
</table>
</FONT>
</TD>

{Comment}
<!-- 10/22/99
<TD NOWRAP WIDTH="100%">{itag Package CellParam1Open}
<NOBR>
<INPUT TYPE="radio" NAME="ageRange" VALUE="yes" {if {ageRange}
-eq yes}CHECKED{endif}>□□<br>
<INPUT TYPE="radio" NAME="ageRange" VALUE="no" {if {ageRange}
-eq no}CHECKED{endif}>□□□
</NOBR>{itag Package CellParam1Close}</TD>
-->
{EndComment}
</TR>

<TR>
<TD   WIDTH=20>
     {if familyOnly:error}
          <IMG BORDER=0
          WIDTH=19
          HEIGHT=17
          SRC="/images/alert.gif">
     {endif}
</TD>
<TD {itag Package TDParam2} WIDTH="100%">

{itag Package CellParam1Open}
□□□□□□□□□□□□□□□□□□□□□□□□□□□□□□□□□□□□□□□□□□
{itag Package CellParam1Close}
</TD>

<TD NOWRAP>{itag Package CellParam1Open}
<NOBR>
<INPUT TYPE="radio" NAME="familyOnly" VALUE="yes" {if
{familyOnly} -eq yes}CHECKED{endif}>□□<br>
<INPUT TYPE="radio" NAME="familyOnly" VALUE="no" {if
{familyOnly} -eq no}CHECKED{endif}>□□□
</NOBR>{itag Package CellParam1Close}</TD>
</TR>
```

```
<TR>
<TD   WIDTH=20>
      {if nonFleetGrade:error}
            <IMG  BORDER=0
            WIDTH=19
            HEIGHT=17
            SRC="/images/alert.gif">
      {endif}
</TD>
<TD {itag Package TDParam2}>
{itag Package CellParam1Open}
□□□□□□□□□□□□□□□□□□□□□□□□□□□□□□□□□□□□□□□□
{itag Package CellParam1Close}</TD>
<TD NOWRAP>{itag Package CellParam1Open}
<NOBR>
<INPUT TYPE="radio" NAME="nonFleetGrade" VALUE="yes" {if
{nonFleetGrade} -eq yes}CHECKED{endif}>□□<br>
<INPUT TYPE="radio" NAME="nonFleetGrade" VALUE="no" {if
{nonFleetGrade} -eq no}CHECKED{endif}>□□□
</NOBR>{itag Package CellParam1Close}</TD>
</TR>

<TR>
<TD   WIDTH=20>
      {if accident:error}
            <IMG  BORDER=0
            WIDTH=19
            HEIGHT=17
            SRC="/images/alert.gif">
      {endif}
</TD>
<TD {itag Package TDParam2}>
{itag Package CellParam1Open}
□□□□□□□□□□□□□□□□□□□□□□□□□□□□□□□□□□□□□□□□
□□□□□□□
{itag Package CellParam1Close}</TD>
<TD NOWRAP>{itag Package CellParam1Open}
<NOBR>
<INPUT TYPE="radio" NAME="accident" VALUE="yes" {if {accident}
-eq yes}CHECKED{endif}>□□<br>
<INPUT TYPE="radio" NAME="accident" VALUE="no" {if {accident}
-eq no}CHECKED{endif}>□□□
</NOBR>{itag Package CellParam1Close}</TD>
</TR>

<TR>
<TD   WIDTH=20>
      {if lowMile:error}
            <IMG  BORDER=0
            WIDTH=19
            HEIGHT=17
            SRC="/images/alert.gif">
      {endif}
</TD>
<TD {itag Package TDParam2}>
{itag Package CellParam1Open}
□□□□□□□□□□□□□□□□□□□□□□□□□□□□□□□□□□□□□□□□
```

```
{itag Package CellParam1Close}</TD>
<TD NOWRAP>{itag Package CellParam1Open}
<NOBR>
<INPUT TYPE="radio" NAME="lowMile" VALUE="yes" {if {lowMile} -
eq yes}CHECKED{endif}>□□<br>
<INPUT TYPE="radio" NAME="lowMile" VALUE="no" {if {lowMile} -
eq no}CHECKED{endif}>□□□
</NOBR>{itag Package CellParam1Close}</TD>
</TR>

<TR>
<TD  WIDTH=20>
     {if discount:error}
         <IMG  BORDER=0
         WIDTH=19
         HEIGHT=17
         SRC="/images/alert.gif">
     {endif}
</TD>
<TD {itag Package TDParam2}>
{itag Package CellParam1Open}
□□□□□□□□□□□□□□□□□□□□□□□□□□□□□□□□□□□□□□
□□□□□□□
{itag Package CellParam1Close}</TD>
<TD NOWRAP>{itag Package CellParam1Open}
<NOBR>
<INPUT TYPE="radio" NAME="discount" VALUE="yes" {if {discount}
-eq yes}CHECKED{endif}>□□<br>
<INPUT TYPE="radio" NAME="discount" VALUE="no" {if {discount}
-eq no}CHECKED{endif}>□□□
</NOBR>{itag Package CellParam1Close}</TD>
</TR>
<P>
<TR>
<TD  WIDTH=20>
     {if tmpCancel:error}
         <IMG  BORDER=0
         WIDTH=19
         HEIGHT=17
         SRC="/images/alert.gif">
     {endif}
</TD>
<TD {itag Package TDParam2}>
{itag Package CellParam1Open}
□□□□□□□□□□□□□□□□□□□□□□□□□□□□□□□□□□□□□□
□□□□□□□
{itag Package CellParam1Close}</TD>
<TD NOWRAP>{itag Package CellParam1Open}
<NOBR>
<INPUT TYPE="radio" NAME="tmpCancel" VALUE="yes" {if
{tmpCancel} -eq yes}CHECKED{endif}>□□<br>
<INPUT TYPE="radio" NAME="tmpCancel" VALUE="no" {if
{tmpCancel} -eq no}CHECKED{endif}>□□□
</NOBR>{itag Package CellParam1Close}</TD>
</TR>
<P>
```

```
<TR>
<TD  WIDTH=20>
    {if equipment:error}
        <IMG BORDER=0
        WIDTH=19
        HEIGHT=17
        SRC="/images/alert.gif">
    {endif}
</TD>
<TD {itag Package TDParam2}>
{itag Package CellParam1Open}
□□□□□□□□□□□□□□□□□□□□□□□□□□□□□
{itag Package CellParam1Close}
</TD>
<TD>
<NOBR>
{itag Package CellParam1Open}
<INPUT TYPE="radio" NAME="equipment" VALUE="yes" {if
{equipment} -eq yes}CHECKED{endif}>□□<br>
<INPUT TYPE="radio" NAME="equipment" VALUE="no" {if
{equipment} -eq no}CHECKED{endif}>□□□
{itag Package CellParam1Close}
</NOBR>
</TD>
</TR>

<TR>
<TD  WIDTH=20>
</TD>

<TD>
{itag Package CellParam1Open}
<UL>
<li size = "2"> □□□□□□□□□□□□□□□□□□□<br>
<li size = "2"> □□□□□□□□□□□□□□□□<br>
<li size = "2"> □□□□□□<br>
<li size = "2"> □□□□□□□<br>
<li size = "2"> □□□□<br>
</UL>
{itag Package CellParam1Close}
</TD>

{Comment}<!-- 10/22/99
<TD NOWRAP>{itag Package CellParam1Open}
<NOBR>
<INPUT TYPE="radio" NAME="equipment" VALUE="yes" {if
{equipment} -eq yes}CHECKED{endif}>□□<br>
<INPUT TYPE="radio" NAME="equipment" VALUE="no" {if
{equipment} -eq no}CHECKED{endif}>□□□
</NOBR>{itag Package CellParam1Close}
</TD>
--!>
{EndComment}

</TR>

<TR>
```

```
<TD   WIDTH=20>
      {if review:error}
            <IMG BORDER=0
            WIDTH=19
            HEIGHT=17
            SRC="/images/alert.gif">
      {endif}
</TD>

<TD {itag Package TDParam2}>
{itag Package CellParam1Open}
☐☐☐☐☐☐☐☐☐☐☐☐☐☐☐☐☐☐☐☐☐☐☐☐
{itag Package CellParam1Close}
</TD>
<TD NOWRAP>
{itag Package CellParam1Open}
<NOBR>
<INPUT TYPE="radio" NAME="review" VALUE="yes" {if {review} -eq
yes}CHECKED{endif}>☐☐<br>
<INPUT TYPE="radio" NAME="review" VALUE="no" {if {review} -eq
no}CHECKED{endif}>☐☐☐
</NOBR>{itag Package CellParam1Close}</TD>
</TR>
</TABLE>

<P>
<CENTER>
<INPUT TYPE="submit" NAME="Submit" VALUE="☐☐☐☐☐☐">
<INPUT TYPE="reset" VALUE="Reset">
</FORM>
</CENTER>

<P>
<FONT SIZE=-1>
☐☐☐☐☐☐☐☐☐☐☐☐☐☐☐☐☐☐☐☐☐☐☐☐☐☐☐☐☐☐☐☐
☐☐☐☐☐☐☐☐☐☐☐☐☐☐☐☐☐☐☐☐☐☐☐☐☐☐☐☐☐☐☐☐☐☐
☐☐☐☐☐☐☐☐☐☐☐☐☐☐☐☐☐☐☐☐☐☐☐☐☐☐☐☐☐☐☐☐☐☐
</FONT>

</TD>
</TR>
</TABLE>
<p>

</FONT>

{itag Package Footer}

</BODY></HTML>
```

Appendix II

Template Output
(showing Unicode Characters)

{Comment} Y2K Compliance : 02/01/1999 StandardFollowed akrish {EndComment} {Comment} {EndComment} {itag Package Header} {itag Package NavigationBar}

| submit | /gic/auto/save/d | {cookie} | {id} | ā☐‹ |

}itag Package TitleParamOpen{

☐ ☐ ☐ ☐ ☐ ☐

}itag Package TitleParamClose{

{● page:error}
☐ ☐ ☐ ☐ ☐ ☐ ☐ ☐ ☐ ☐ ☐ ☐ ☐

}endif{
{● ageRange:error} }endif{    }itag Package CellParamlOpen{

}itag Package CellParamlClose{    }itag Package
CellParamlOpen{ yes no
    }itag Package CellParamlClose{

◙
◙
◙
◙
◙

{Comment} {EndComment}
{● familyOnly:error} }endif{    }itag Package
CellParamlOpen{

}itag Package CellParamlClose{    }itag Package
CellParamlOpen{ yes no
    }itag Package CellParamlClose{
{● nonFleetGrade:error} }endif{    }itag Package
CellParamlOpen{
                                                                    }itag
Package CellParamlClose{    }itag Package
CellParamlOpen{ yes no
    }itag Package CellParamlClose{
{● accident:error} }endif{    }itag Package
CellParamlOpen{

}itag Package CellParamlClose{    }itag Package
CellParamlOpen{ yes no
    }itag Package CellParamlClose{
{● lowMile:error} }endif{    }itag Package
CellParamlOpen{

}itag Package CellParamlClose{    }itag Package
CellParamlOpen{ yes no
    }itag Package CellParamlClose{
{● discount:error} }endif{
CellParamlOpen{

}itag Package CellParamlClose{    }itag Package

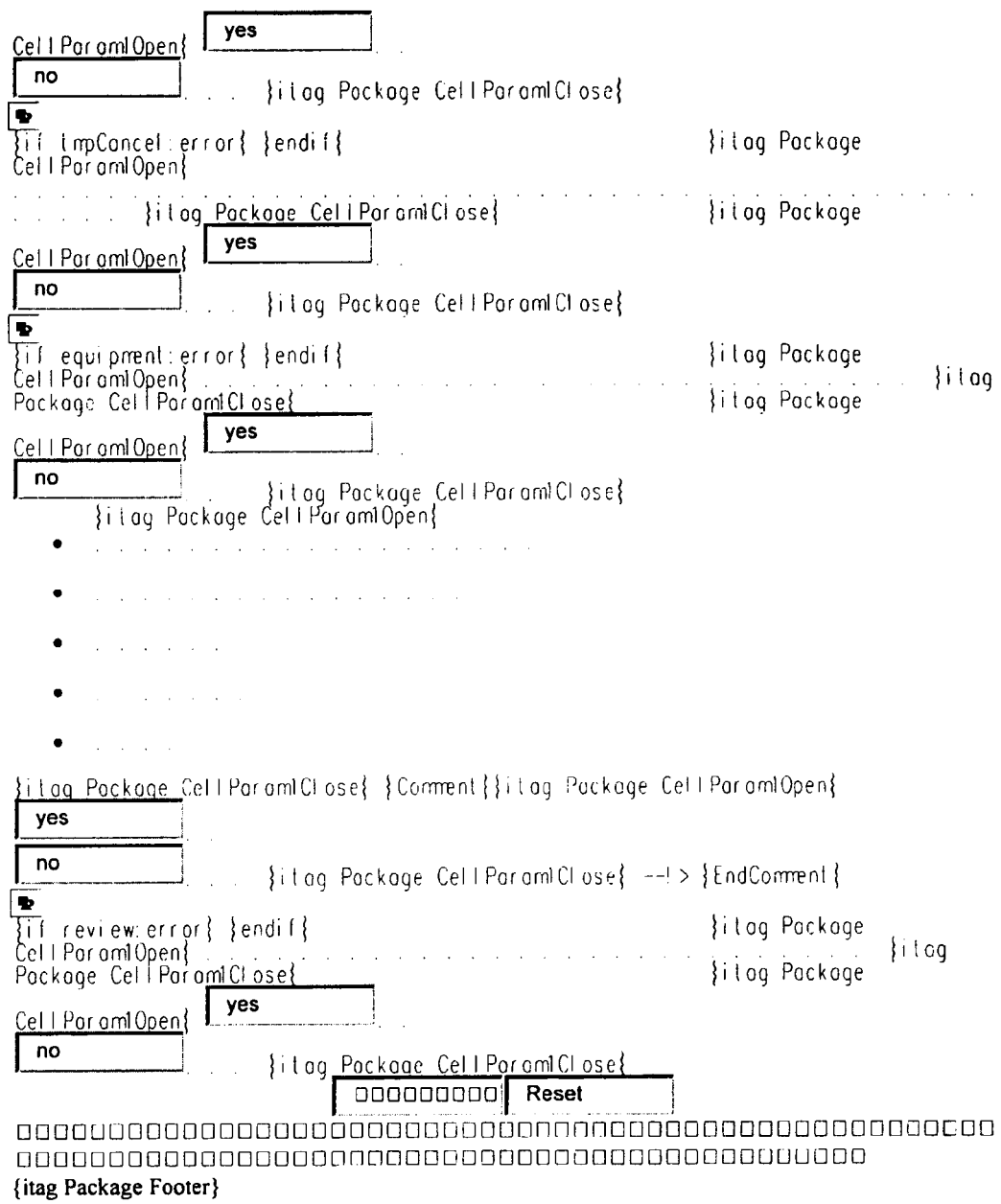
{itag Package Footer}

What is claimed is:

1. A method for processing requests from a computer network, said method comprising:
    accessing the computer network from a computer system;
    receiving a request from a requesting computer attached to the computer network, the request including a data string comprising a plurality of character codes from one of a plurality of character sets;
    storing the request;
    determining a character set used to encode the data string, based upon analysis of a character code of the character codes in the data string;
    converting the data string from the one of the character sets to a uniform language code; and
    storing the uniform language code.

2. The method of claim 1, further comprising:
    storing a predefined character on a web site accessed by the requesting computer;
    placing the predefined character in a predefined area of the data string;
    receiving the character code, wherein the character code corresponds to the predefined character, from the predefined area of the data string;
    and matching the character code to the character set.

3. The method of claim 1, said method further comprising:
    reading the stored uniform language code;
    determining the character set of the requesting computer;
    converting the uniform language code into a character set specific return data string; and
    sending the character set specific return data string to the requesting computer.

4. The method of claim 1, said method further comprising:
    saving the uniform language code in a database.

5. A method for processing requests from a computer network,
    said method comprising:
        receiving a request from a requesting computer via the computer network, the request including a data string;
        determining a Uniform Resource Locator (URL) corresponding to the data string;
        retrieving web page data from a web page corresponding to the URL;
        and returning a responsive web page to the requesting computer, the responsive web page including the web page data, wherein the receiving, the decoding, the matching, and the processing are performed by a computer system coupled to the computer network.

6. A method for processing requests from a computer network,
    said method comprising:
        receiving a request from a requesting computer via the computer network;
        decoding a data string included in the request;
        matching the request to one of a plurality of template files, and
        processing the one of the plurality of template files to generate a web page, wherein the receiving, the decoding, the matching, and the processing are performed by a computer system coupled to the computer network.

7. The method of claim 6 further comprising:
    invoking a department process in response to the matching.

8. The method of claim 7 further comprising:
    determining a character set, the character set including the character set used by the requesting computer.

9. The method of claim 8 wherein the determining further comprises:
    storing a predefined character read by the requesting computer;
    sending the predefined character from the requesting computer to the computer system through the computer network;
    reading a table, the table including a plurality of character codes and corresponding language codes;
    matching the predefined character to one of the plurality of character codes, the matching determining one of the plurality of language codes.

10. The method of claim 9 wherein the predefined character further comprises a returned character code corresponding to a known character code, the method further comprising:
    sending data to the requesting computer, wherein the data includes the known character code.

11. The method of claim 10 further comprising:
    translating the known character code into the returned character code; and
    sending the request from the requesting computer, wherein the request includes the predefined character.

* * * * *